Sept. 8, 1970    H. M. VOGLESONGER    3,527,921
ELECTRIC HEATING SYSTEM
Original Filed Dec. 9, 1966    2 Sheets-Sheet 1
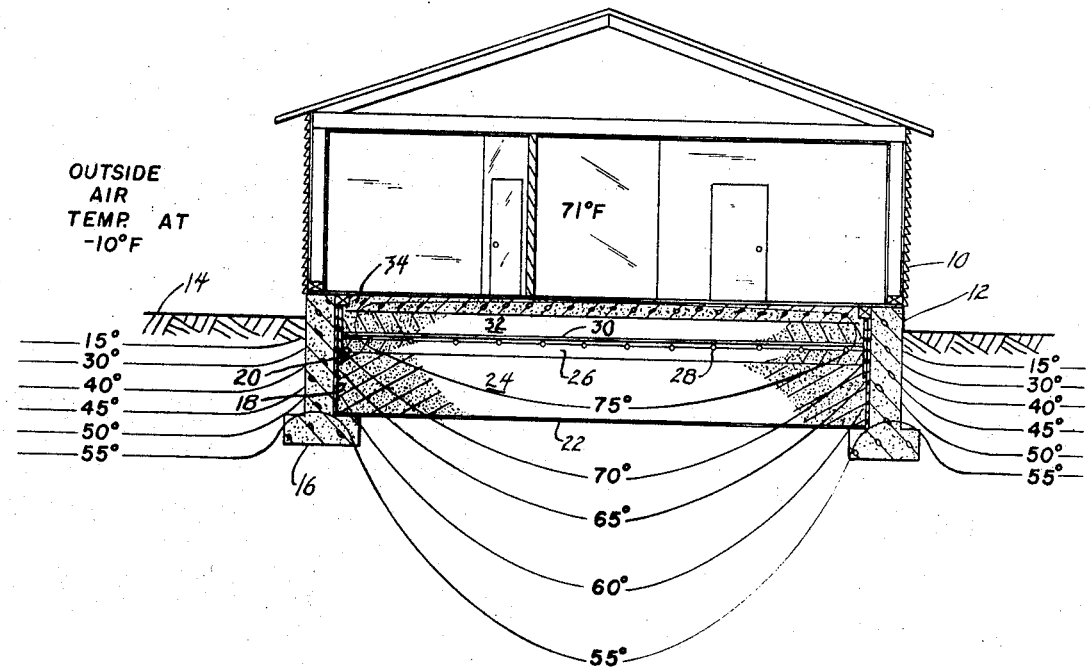
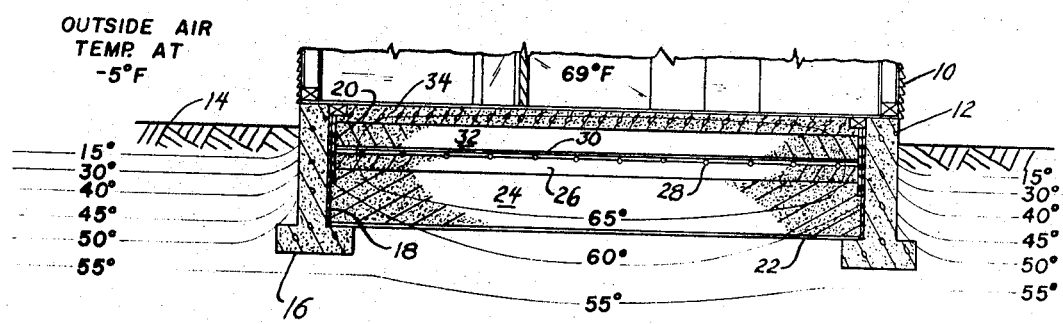
INVENTOR.
Harry M. Voglesonger
BY
McCormick, Paulding & Huber
ATTORNEYS

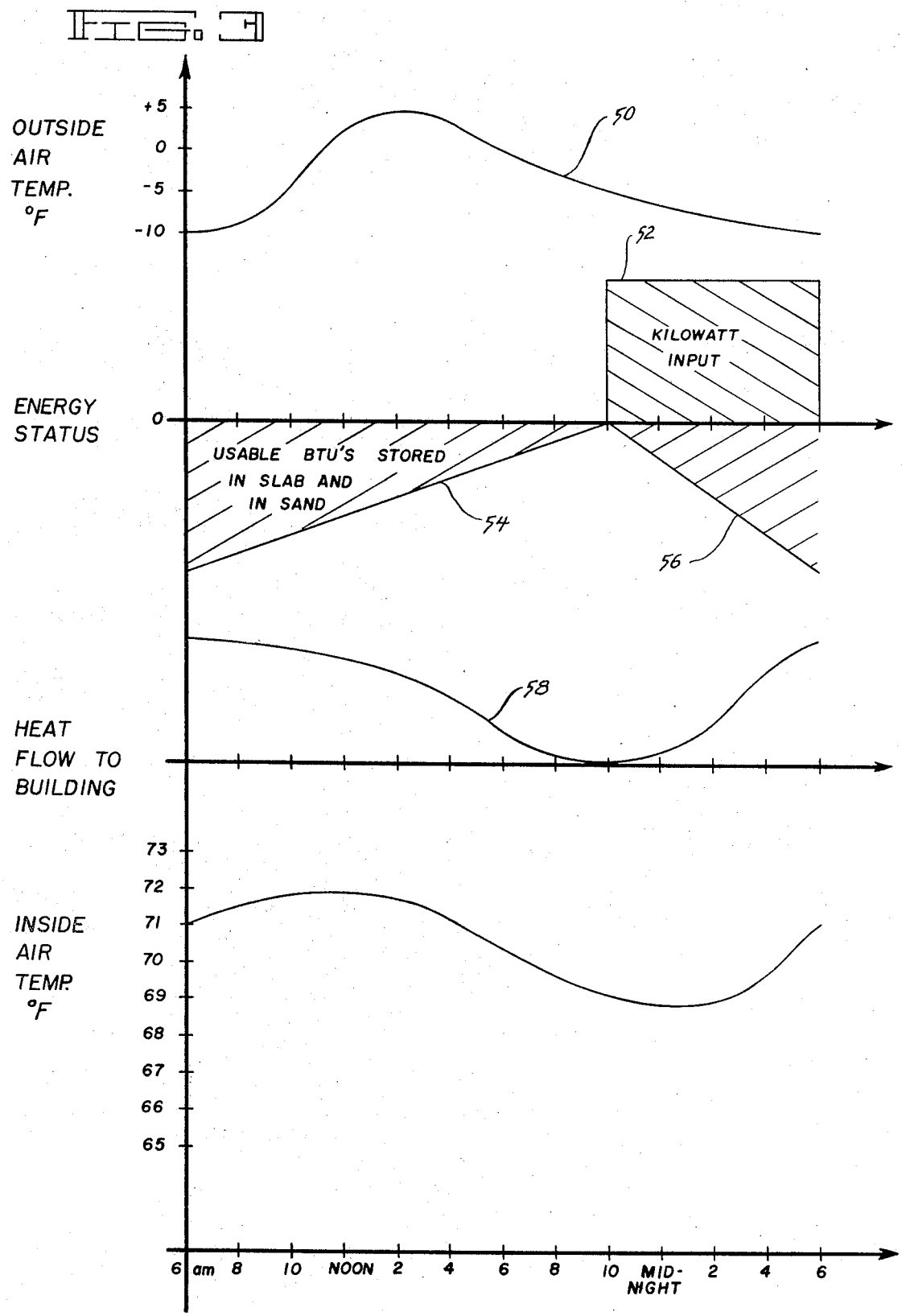

United States Patent Office 3,527,921
Patented Sept. 8, 1970

3,527,921
ELECTRIC HEATING SYSTEM
Harry M. Voglesonger, Riverton, Conn., assignor to The Smith-Gates Corporation, Farmington, Conn., a corporation of Connecticut
Continuation of application Ser. No. 600,612, Dec. 9, 1966. This application Aug. 29, 1968, Ser. No. 778,884
Int. Cl. F24d *13/02;* H05b *1/00*
U.S. Cl. 219—213
10 Claims

ABSTRACT OF THE DISCLOSURE

A building is provided with a peripheral foundation which is insulated to approximately the depth of minimal seasonal temperature variations. A concrete slab provides the floor of the building, and sand is provided below the slab with electrically energizable heating mats located in the sand approximately one foot below the slab to permit storing heat energy in this sand and in the material therebeneath so that electrical power can be used to heat the building for substantial periods of time either to take advantage of off-peak power or to minimize the effects of electrical power failures.

SUMMARY OF INVENTION

This invention relates to a method and apparatus for heating a building or the like being a continuation of my application filed Dec. 9, 1966, Ser. No. 600,612. More particularly this invention deals with a heating system which is designed to use electrical energy primarily during periods of off-peak electrical power so as to take advantage of the lower rates usually charged by the electric utility company during these periods.

A general object of the present invention is to provide an electric heating system which is capable of storing heat energy in an efficient manner so that the system need not be electrically energized except during periods of off-peak, low cost power.

One of the greatest disadvantages attaching to the use of electrical energy for heating buildings has been the absence of a practical means for storing that energy. Whereas, other heating fuels such as coal, gas, or oil may be conveniently stored and used when needed, electrical energy cannot be so stored, and in fact the electric utility companies must gear the supply of electricity to the cyclical demands of both industry and the consuming public.

The electric power companies presently experience periods of very high electrical demand over a large part of the daylight and early evening hours. On the other hand, the demand at other time periods during the day is greatly reduced so that in many areas electric power can be purchased at these periods at a much lower rate. As mentioned above, the object of the present invention is to utilize electrical energy during these periods of off-peak power and to store this energy in the form of heat for use during the greater part of the daylight and early evening hours when the electric power companies are experiencing their greatest demand.

The use of electrically energized heating mats, or cables, sandwiched in a concrete slab is one well known way of heating a building electrically. However, the slab heat approach suffers from several disadvantages, the most serious of which will be discussed hereinbelow.

One disadvantage results from the fact that the time response to a conventional thermostatic control system is such that the heat called for by the thermostat is apt to be quite different from the heat actually required after the slab has come up to temperature. For example, in the early morning, the thermostat will usually call for heat, but several hours must elapse before the slab actually begins to radiate heat. During such a delay the sun may have come out to such an extent that the sun is warming the building and such heat is no longer required. So too, once the sun has warmed the building sufficiently to cause the thermostatic control system to signal that the heat be turned off, it may take many hours for the slab to cool to room temperature again, so that the building will remain at too high a temperature for an extended period of time.

Another disadvantage to slab heating generally is the installed expense. Since the heating element is arranged in the slab, usually quite close to the surface thereof, the slab must be formed in two stages requiring that the concrete be poured at two different times in order to allow the heating contractor sufficient time to install the heating elements and check the various electrical circuits for continuity.

Still another disadvantage to slab heat, at least insofar as electrical heating systems are concerned, is the disadvantage of using electrical energy during periods of peak power. As mentioned above, the impossibility of storing electricity creates a problem for the electric utility company not faced by the suppliers of coal, gas or oil. This disadvantage usually appears to the consumer in the form of increased rates during certain periods of the day.

The present invention seeks to provide an electrical heating system which is capable of storing heat, thereby circumventing the problem of not being able to store the fuel itself, namely electricity. The present invention also seeks to avoid the above-mentioned disadvantage of overheating the slab on which a building is erected.

A more specific object to the present invention is to provide a slab for a building or the like, which slab does not have any internal piping or wiring so as to interfere with the installation of machinery and the like in the slab-floor.

Still another object of the present invention is to provide an electric heating system which utilizes to a large extent the natural heat of the earth itself as one boundary of a relatively large heat reservoir.

Still another object of the present invention is to provide a heating system for a building constructed on a concrete slab, which heating system does not require direct heating for the air in the building, but rather supplies heat indirectly to the concrete slab upon which the building is erected. In this manner the cost advantages associated with having a relatively warm floor, and being able to arrive at a comparatively comfortable air temperature which is substantially lower than that achieved with a direct air heated space are attained. As a result of the warm floor, relatively lower air temperatures can be tolerated with the result that less heat is lost through the walls and roof of the building itself.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

BRIEF DESCRIPTION OF DRAWINGS

FIG. 1 is a vertical section taken through one foundation wall of a building to be heated with a heating system according to the present invention, showing lines of constant temperature corresponding to a particular time during a typical winter day.

FIG. 2 is a vertical section similar to FIG. 1 showing lines of constant temperature during another period of the same day.

FIG. 3 shows in graphic form the variations in outside air temperature during a typical cold winter day, together with a representation of the heat energy stored in accordance with the present invention, the heat flow into the building, and a characteristic variation of the inside air temperature of said building during such a day.

DETAILED DESCRIPTION

Referring now more particularly to the drawings, FIG. 1 shows a building having insulated outside walls 10, 10 which are supported on a perimeter foundation wall 12 extending a suitable distance below the surface of the earth 14 as for example to a depth dictated by the local building regulations. The foundation wall 12 may be of poured concrete construction and is preferably supported by a footing 16 as shown. While the depth of the overall foundation wall and footing construction may vary, in the construction shown in the drawing it is noted that the lowermost portion extends downwardly below the surface of the earth 14 to a depth of approximately that at which the temperature of the earth becomes relatively constant regardless of seasonal variations in outside air temperature. More particularly, it is noted that at a depth of five or six feet below the surface in the northern temperate zone the temperature of the earth is relatively constant at 55° F. and remains at this temperature for several hundred feet.

The temperature gradient above the 55° level will of course depend upon the seasonal outside air temperature, as for example, at the left-hand side of FIGS. 1 and 2 with an outside air temperature of approximately minus 10° F. to minus 5° F. lines of constant temperature, or isobars, can be drawn substantially as shown so that the temperature at a 12 inch depth is roughly 15° and at 18 inches approximately 30°, etc. to the temperature of 55° as shown.

In accordance with the present invention, the inside surface of the concrete foundation wall 12 is insulated with 4 feet by 8 feet panels of 2 inch Styrofoam as shown at 18. As will be apparent from the description to follow, the upper portion of the concrete foundation wall is insulated to a greater extent than the lower portion thereof chiefly because of the higher temperature gradient across the upper wall portion. Preferably, a second layer of 2 inch Styrofoam 20 is provided around this portion of the wall 12 to a depth of some 2½ to 3 feet. While the actual height of the concrete foundation wall 12 above the surface 14 of the earth may vary, this distance should be kept to a minimum. In the example shown, this height is about 12 inches so that the second layer of Styrofoam 20 extends well below the level of the surface 14.

In relatively wet soil where a substantial degree of moisture is present in the ground, an impervious plastic sheet 22 is provided at the level of the concrete footing 16 in order to provide a vapor barrier between the earth itself and the dry fill used to fill up the lower portion of the excavation as shown at 24 in FIG. 1. The plastic sheet 22 is used primarily to provide a vapor barrier and to maintain the fill 24 in a dry condition. In the event that no ground water is present in the earth at the excavation site, the plastic sheet 22 might be dispensed with.

In further accordance with the present invention, a layer of dry sand or other suitable material 26 is provided on top of the fill 24 to a depth of anywhere from 3 inches to 6 inches. With reference to this layer 26, it is noted that the requirement for this sand is primarily to provide a relatively soft bed upon which the heating mats 28 can be placed. If the fill 24 does not contain large stones or other material, the mat 28 might be placed directly upon the fill 24.

The next step in constructing a heated building according to the present invention lies in the placing of the heating mats 28, 28 on the sand layer 26 as shown in FIG. 1. It is noted that the double layer of Styrofoam insulation material 18 and 20 extends well below the location of the heating mats 28, 28. With further reference to the location of the heating mat 28, it is noted that this important element is located approximately 18 inches below the upper surface of the concrete slab, which comprises the floor of the building. In the embodiment shown a perforated plastic sheet 30 is laid on top of the heating mats 28, 28 so as to protect these elements from heavy equipment or the like used in filling the remaining portion of the excavation with a relatively thick layer of dry sand as indicated generally at 32. While sand is mentioned as a preferred substance for use above and below the heating mat 28, it is noted that any suitable pulverized material might be used provided only that no organic material is present which might weaken the substructure for the concrete slab or provide a recess for condensation or the like. The use of the term "material of sandlike consistency" is adopted in the appended claims in order to described such a substance.

Finally, in further accordance with the present invention, a concrete slab is poured on top of the sand 32 to a depth of from 6 to 8 inches, which slab may be poured in one continuous operation since the heating elements 28 are located outside of this slab rather than sandwiched therein as in prior art constructions.

Turning now to FIG. 3, a typical variation of outside air temperature with time through a normal cold winter day is there decpicted at 50. It will be seen that shortly before dawn a minimum temperature of minus 10° F. is reached followed by a gradual warming trend until approximately 1:00 in the afternoon at which time the temperature begins to drop from an arbitrary plus 5° back toward the early morning low of minus 10°.

Still with reference to FIG. 3, there is depicted at 52 the preferred energy build-up of electrical power between the hours of 10 p.m. and 6 a.m. This block 52 corresponds to the use of off-peak power alluded to previously.

Still with reference to FIG. 3, the triangular-shaped areas at 54 and 56 illustrate the storage of heat energy in the system described hereinabove with reference to FIG. 1 with the maximum heat energy being stored at 6 a.m. and the minimum at 10 p.m.

The line 58 of FIG. 3 illustrates the relative heat flow into the building of FIG. 1 from the area below the concrete slab 34. This curve 58 varies in proportion to the quantity of heat energy stored below the floor and is also an indication of the variation of temperature of the concrete slab 34 and of the dry sand therebeneath.

Finally, and still with reference to FIG. 3, a typical variation of inside air temperature in the building is there illustrated showing that the inside air temperature can be held relatively constant within 3 degrees or so, in spite of operation of the electric heating mats 28, 28 only between the hours of 10 p.m. and 6 a.m. as mentioned previously. The maximum temperature will be reached between the hours of 10 a.m. and noon while the minimum temperature will occur at approximately midnight when the building is presumably vacant. In a commercial building the heating system of the present invention will have particular advantage since the building will only be occupied by personnel in most cases between the hours of 8 a.m. and 6 p.m. at which time the inside air temperature is held within one degree of 71° F. It will of course be apparent that the actual temperatures will vary depending upon the desired temperature range, the foregoing values being chosen for purposes of illustration only. However, the actual shape of the curves in FIG. 3 are intended to be representative of any heating system constructed in accordance with the present invention.

Turning now to FIG. 2, it will be seen that this figure is identical to FIG. 1 except that the temperature distribution corresponds to a time of 10 p.m. or just prior to electrical energizing of the system. FIG. 1, on the other hand, shows the temperature distribution of the earth, sand and concrete slab at 6 a.m. or just after the system has been electrically de-energized.

A comparison of FIGS. 1 and 2 reveals the effects of energizing the electric heating mats 28, 28 when said mats are located in the particular position outlined hereinabove in connection with the construction of a heating system of the present invention. In FIG. 2 the 55° temperature line will be seen to extend nearly horizontally beneath the entire building, all of the heat supplied by the mats having been radiated or conducted away to the building, and indirectly to the air within the building, so that the latter has reached a temperature of approximately 69° F. as shown. It will of course be apparent that should the mats 28, 28 not be re-energized, the temperature of the air within the building would eventually drop to the outside air temperature of minus 5° F. with the fill, the sand, and the concrete slab being correspondingly lowered to temperatures approximately those of the ground itself as shown to the left of FIGS. 1 and 2. As mentioned previously, FIG. 2 corresponds to a time of approximately 10 p.m., at which time the electric utility company supplies electrical energy at reduced rates, due to the off-peak demand. The temperature of the mats 28, 28 can now be increased so as to supply heat to the sand and the slab 34 until at 6 a.m. the temperature distribution corresponds to that depicted in FIG. 1. At 6 a.m. the heat reservoir comprises not only the concrete slab and the subadjacent sand in which the mats 28 are placed, but also the dry fill beneath the sand, plus to a certain extent at least, the earth beneath the footings 16, 16 as indicated by the dome-shaped curve of the 55° line. The temperature distribution lines indicated generally at 60° F., 65° F. and 70° F. also illustrate the dome-shape distribution of the heat storage reservoir which can be taken advantage of with a heating system constructed in accordance with the present invention. Depending upon the size of the building to be heated, it will be seen that the dome-shaped heat reservoir may be of considerable size. A major advance is thereby achieved in thus utilizing the space below the concrete slab 34 as a heat reservoir in that the lower limit of this heat reservoir, namely the 55° line depicted in FIG. 1, will have no heat transfer thereacross since the temperature below this line remains constant at the same 55°. Thus by reason of insulating the perimeter wall 12 with the Styrofoam as indicated generally at 18 and 20 an insulated heat storage reservoir is provided at very minimal expense, which reservoir is capable of storing sufficient heat so that the building itself can be heated in a very economical manner.

What is claimed is:

1. An electric heating system for buildings or the like comprising in combination a concrete slab having an upper surface which defines the floor of said building, a wall extending peripherally around said slab and extending downwardly therebelow into the surrounding earth, a layer of packed material of sand-like consistency below said slab and having a depth substantially thicker than the concrete slab, and electrically energizable heat generating means in said material and located in a plane which is spaced downwardly well below the undersurface of said slab by a distance in the range between 6 to 12 inches.

2. An electric heating system as set forth in claim 1 wherein said wall comprises a concrete foundation wall, and a layer of heat insulating substance adjacent the inner surface thereof said insulating substance extending from adjacent the top of said concrete wall to at least the level of said heat generating means.

3. An electric heating system as set forth in claim 2 wherein said heat generating means comprise electric resistance wires arranged in flat mats approximately one foot below the under surface of said slab.

4. An electric heating system as set forth in claim 2 wherein said insulating substance comprises at least one sheet of Styrofoam extending at least one foot below the depth of said heat generating means.

5. An electric heating system as set forth in claim 4 wherein said Styrofoam sheet extends below the earth's surface to a depth characterized by minimal seasonal temperature variation.

6. A method of storing heat energy so that off-peak electrical power can be used to heat a building or the like, said method comprising the steps of excavating a quantity of earth to form a cavity, erecting a peripheral wall around said cavity, filling said cavity with material of sand-like consistency to near the top of said wall, providing electrically operated heating means in said material and at a depth which is in the range between 6 to 12 inches below the upper surface of said material, pouring a one-piece concrete slab on said upper surface, and energizing said heating means during periods of off-peak power to store heat in said slab and the material therebeneath.

7. The method according to claim 6 and further characterized by the step of insulating said wall to reduce the heat loss therethrough.

8. The method according to claim 7 wherein said slab is poured to a depth of approximately 6 inches in a single continuous pouring, and wherein said heating means is located approximately 12 inches below said slab.

9. The method according to claim 8 wherein said heating means is continuously energized for at least 4 hours so that the material therebelow is heated to a significant depth to form a dome-shaped heat reservoir of sufficient size to provide continuous heat to said slab during the remaining 20 hours of the day.

10. The method according to claim 9 wherein said sand-like fill material is packed to a depth of approximately 18 inches below the top of said wall to receive said heating means as aforesaid and wherein a perforated plastic sheet is layed over said heating means prior to packing the remaining quantity of sand-like fill in place thereabove.

References Cited

UNITED STATES PATENTS

| 2,584,573 | 2/1952 | Gay | 165—45 X |
| 2,889,991 | 6/1959 | Follansbee | 219—213 X |
| 2,954,680 | 10/1960 | Ruff | 165—45 X |

OTHER REFERENCES

Philip Hallock and R. U. Hall: House for Mr. and Mrs. William Moorhouse, reprinted from New Pencil Points, December 1943.

JOSEPH V. TRUHE, Primary Examiner

P. W. GOWDEY, Assistant Examiner

U.S. Cl. X.R.

165—18, 45